United States Patent
Hakeem et al.

(10) Patent No.: US 10,018,475 B2
(45) Date of Patent: Jul. 10, 2018

(54) WATER DEPTH DETECTION FOR VEHICLE NAVIGATION

(71) Applicant: Ford Global Technologies, LLC, Dearborn, MI (US)

(72) Inventors: Mohannad Hakeem, Dearborn, MI (US); Umer Khalid, Farmington Hills, MI (US); Mohamed Mattar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/261,352

(22) Filed: Sep. 9, 2016

(65) Prior Publication Data

US 2018/0073879 A1     Mar. 15, 2018

(51) Int. Cl.
| | |
|---|---|
| *G01C 21/20* | (2006.01) |
| *G01C 21/34* | (2006.01) |
| *B64C 39/00* | (2006.01) |
| *B64C 39/02* | (2006.01) |
| *G01C 21/36* | (2006.01) |

(52) U.S. Cl.
CPC .......... *G01C 21/3415* (2013.01); *B64C 39/02* (2013.01); *G01C 21/20* (2013.01); *G01C 21/3691* (2013.01); *B64C 2201/125* (2013.01)

(58) Field of Classification Search
CPC ........ G01C 21/00; G01C 21/20; G01C 21/26; G01C 21/34; G01C 21/36; G01C 21/3691; B64C 39/00; B64C 39/02; G01S 1/00

See application file for complete search history.

(56) References Cited

U.S. PATENT DOCUMENTS

| | | | | | |
|---|---|---|---|---|---|
| 6,133,853 | A | * | 10/2000 | Obradovich | G01C 21/20 340/488 |
| 6,148,261 | A | * | 11/2000 | Obradovich | G01C 21/20 340/286.01 |
| 6,615,133 | B2 | * | 9/2003 | Boies | G01C 21/3484 340/905 |
| 6,650,244 | B1 | | 11/2003 | Chen et al. | |
| 6,845,324 | B2 | | 1/2005 | Smith | |

(Continued)

FOREIGN PATENT DOCUMENTS

| | | |
|---|---|---|
| CN | 102795109 A | 11/2012 |
| CN | 103569012 A | 2/2014 |
| EP | 2698299 A1 | 2/2014 |
| JP | 2011113185 A | 6/2011 |
| JP | 2016085080 A | 5/2016 |

OTHER PUBLICATIONS

Core System Requirements Specification (SyRS), www.its.dot.gov/index.htm Revision A—Jun. 13, 2011 (pp. 1-131).
Search Report dated Jan. 25, 2018, for GB Patent Application No. GB 1714320.7 (4 pages).

*Primary Examiner* — Yonel Beaulieu
(74) *Attorney, Agent, or Firm* — James P. Muraff; Neal, Gerber & Eisenberg LLP

(57) ABSTRACT

Methods and apparatus are disclosed for vehicle navigation with water depth detection. An example disclosed method includes determining a current and a projected water depth for road segments of and around a current route to a destination. Additionally, the example method includes, in response to the current or the projected water depth of the road segments of the current route exceeding a first threshold, determining an alternate route to the destination.

11 Claims, 4 Drawing Sheets

(56) References Cited

U.S. PATENT DOCUMENTS

| | | | |
|---|---|---|---|
| 7,403,098 B2 | 7/2008 | Watkins et al. | |
| 7,571,029 B2 | 8/2009 | Dai et al. | |
| 8,135,500 B1* | 3/2012 | Robinson | G01C 23/00 |
| | | | 701/14 |
| 9,227,479 B2 | 1/2016 | Clark et al. | |
| 2004/0036601 A1* | 2/2004 | Obradovich | B60C 23/04 |
| | | | 340/540 |
| 2006/0064242 A1* | 3/2006 | Litvack | G01C 21/203 |
| | | | 701/410 |
| 2007/0138347 A1* | 6/2007 | Ehlers | G01C 21/3461 |
| | | | 246/1 R |
| 2007/0242884 A1* | 10/2007 | Dugan | G01C 13/008 |
| | | | 382/190 |
| 2008/0133131 A1* | 6/2008 | Poreda | G01C 21/203 |
| | | | 701/418 |
| 2011/0313655 A1* | 12/2011 | Litvack | G01C 21/20 |
| | | | 701/426 |
| 2014/0257693 A1* | 9/2014 | Ehlers | G01C 21/3461 |
| | | | 701/522 |
| 2017/0090478 A1* | 3/2017 | Blayvas | G01C 21/3453 |
| 2017/0227638 A1* | 8/2017 | Nicoletti | G01S 15/89 |
| 2017/0254649 A1* | 9/2017 | Carnevali | G01C 21/203 |

* cited by examiner

WATER DEPTH DETECTION FOR VEHICLE NAVIGATION

TECHNICAL FIELD

The present disclosure generally relates to vehicle navigation and, more specifically, water depth detection.

BACKGROUND

During flash flooding and hazardous weather conditions, water levels in the streets may reach dangerous levels due to improper drainage system and/or local geography. Often, when the streets are flooded, drivers misjudge the water depth their vehicles can drive through. This results in severe damage to the vehicle and may leave the driver stranded.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for vehicle navigation with water depth detection. An example disclosed method includes determining a current and a projected water depth for road segments of and around a current route to a destination. Additionally, the example method includes, in response to the current or the projected water depth of the road segments of the current route exceeding a first threshold, determining an alternate route to the destination.

An example vehicle includes memory and a processor. The memory stores instructions for vehicle navigation with water depth detection. The example processor executes the instructions to cause the vehicle to determine a current and a projected water depth for road segments of and around a current route to a destination. Additionally, the instructions cause the vehicle to, in response to the current or the projected water depth of the road segments of the current route exceeding a first threshold, determine an alternate route to the destination.

An tangible computer readable medium comprises instructions that, when executed, cause a vehicle to determine a current and a projected water depth for road segments of and around a current route to a destination. The instructions also cause the vehicle to, in response to the current or the projected water depth of the road segments of the current route exceeding a first threshold, determine an alternate route to the destination.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
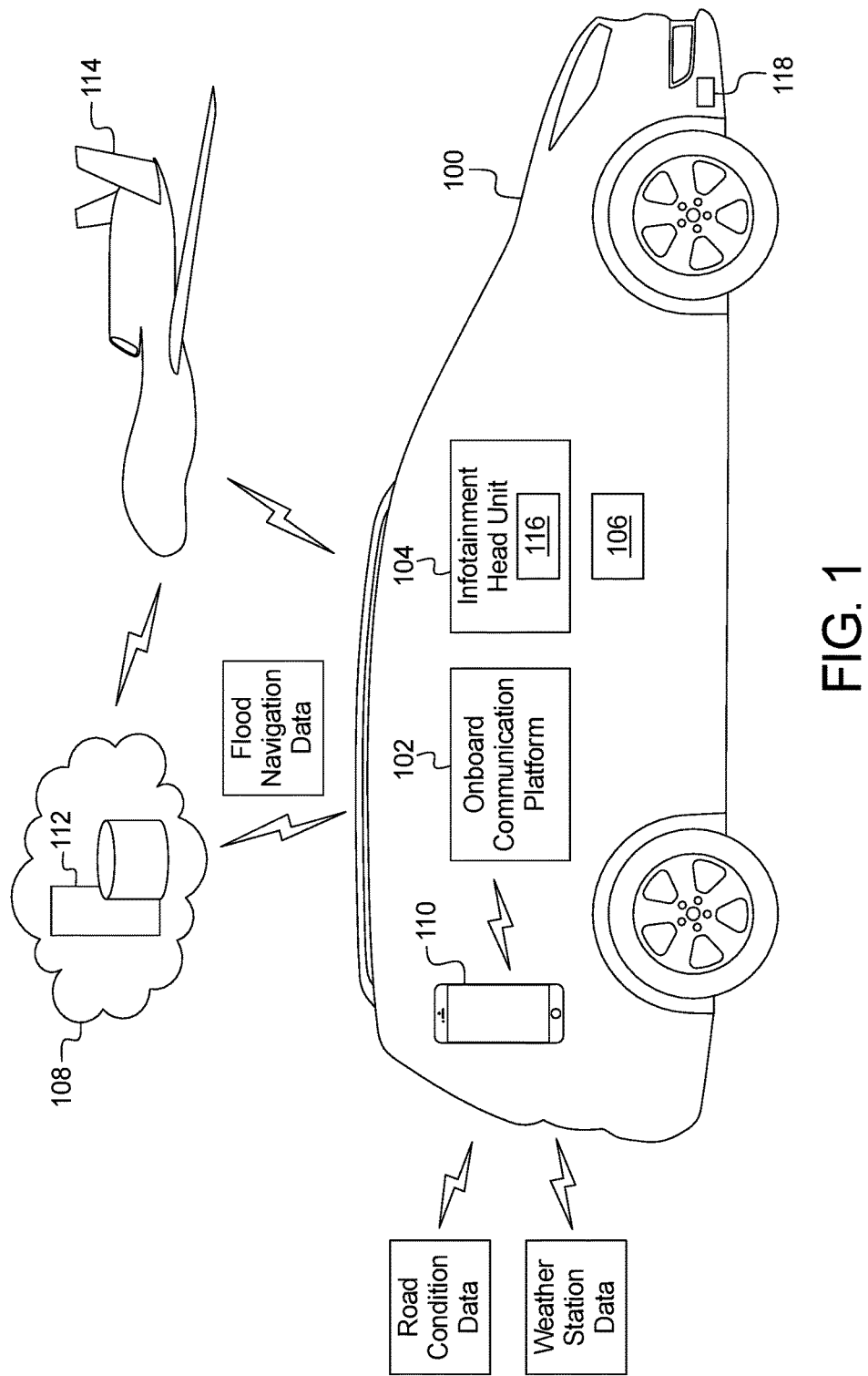
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

During period of rain, significant amounts of water may accumulate on a road because of flooding or poor drainage. Generally, drivers should avoid flooded roadways. Water six inches deeps can cause damage to the vehicle, and vehicles can be carried away in water that is twelve inches deep. However, in some circumstances, the driver needs to, if able, traverse the flooded roadway. However, while driving, it is difficult to estimate the depth of the accumulated water, especially because water masks dips in the road. Additionally, it is difficult to know the condition of potential alternative routes. As disclosed below, a water depth detector receives navigation data, meteorological data, and/or historical flooding data, etc. to determine the current and/or future depth of water on the roadway. The water depth detector is displays a map to the driver showing flooded areas and highlighting ones that are known to be dangerous to the vehicle. In some examples, the water depth detector provides one or more alternative routes to the vehicle's destination. In some examples, the water depth detector controls hydraulics and shock absorber stiffness to stay as high as possible off the ground when driving through flooded roadways.

FIG. 1 illustrates a vehicle 100 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes an on-board communications platform 102, an infotainment head unit 104, and a water depth detector 106.

The on-board communications platform 102 includes wired or wireless network interfaces to enable communication with external networks 108. The on-board communications platform 102 also includes hardware (e.g., processors, memory, storage, antenna, etc.) and software to control the wired or wireless network interfaces. In the illustrated example, the on-board communications platform 102 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), and Wireless Gigabit (IEEE 802.11ad), etc.). In some examples, the on-board communications platform 102 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In some examples, the on-board communications platform 102 includes a global positioning (GPS) receiver that provides the coordinates of the vehicle 100.

Additionally or alternatively, in some examples, the on-board communications platform 102 includes a dedicated short range communication (DSRC) controller to communication with other nearby vehicles and/or wireless nodes installed on infrastructure (such as weather stations, traffic signals, bridges, buildings, etc.). DSRC is an implementation of vehicle-to-vehicle (V2V) and vehicle-to-infrastructure (V2I) communication. Any other implementation may be used. More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA%20(2011-06-13).pdf), which is hereby incorporated by reference in its entirety along with all of the documents referenced on pages 11 to 14 of the SyRS report. In some such examples, the vehicle 100 may communicated with the external network 108 via the DSRC controller. In some examples, the vehicle receives, via the DSRC controller, current road condition data (e.g., real-time water accumulation data, etc.) from infrastructure nodes, other vehicles, and/or weather stations. Additionally, in some examples, the on-board communications platform 102 includes an auxiliary port for a wired connection and/or a short-range wireless module for a wireless connection to a mobile device 110 (e.g., a smart phone, a smart watch, a tablet, etc.). The short-range wireless module includes the hardware and firmware to establish the connection with the mobile device 110. In some examples, the short-range wireless module implements the Bluetooth and/or Bluetooth Low Energy (BLE) protocols. The Bluetooth and BLE protocols are set forth in Volume 6 of the Bluetooth Specification 4.0 (and subsequent revisions) maintained by the Bluetooth Special Interest Group. In some examples, the on-board communications platform 102 connects to the external network 108 via the mobile device 110. In such examples, the vehicle 100 may communicated with the external network 108 via the coupled mobile device.

The external network(s) 108 may be a public network, such as the Internet; a private network, such as an intranet; or combinations thereof, and may utilize a variety of networking protocols now available or later developed including, but not limited to, TCP/IP-based networking protocols. The vehicle 100 communicates to one or more servers 112. The servers 112 are maintained by any suitable entities with an interest in weather and/or navigation, such as a government agency (e.g., the National Weather Service, the National Oceanic and Atmospheric Administration, etc.), a commercial weather forecast provider (e.g., AccuWeather®, Weather Underground®, etc.), and/or a mapping service (e.g., Google® Maps, Apple® Maps, Waze®, etc.), etc. In some examples, the vehicle 100 accesses data from the servers 112 via application programming interfaces (APIs) provided by the managing entity. The servers 112 provide weather and traffic data. For example, the servers 112 may provide (a) live weather data (e.g., current rainfall, forecasted rainfall, expected accumulation rate, etc.), (b) historical flood data (e.g., commonly flooded areas, historical locations of abandoned vehicle, historical water accumulation), (c) navigation data (e.g., road segment data for the region around the vehicle 100), and/or (d) data from a weather drone 114 (e.g., real-time water accumulation data, hazard detection data, etc.), etc. In some examples, the data received from the servers 112 is limited to data within a geographic region around the location of the vehicle 100 (e.g., provided through the APIs). As used herein, a road segment is a contiguous section of a road that has common characteristics (e.g., lane configurations, speed limit, elevation, grade, curvature, etc.). For example, a road segment may represent a portion of road between two intersections.

The infotainment head unit 104 provides an interface between the vehicle 100 and a user. The infotainment head unit 104 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 104 includes hardware (e.g., a processor or controller, memory, storage, etc.) and software (e.g., an operating system, etc.) for an infotainment system 116 (such as SYNC® and MyFord Touch® by Ford®, Entune® by Toyota®, IntelliLink® by GMC®, etc.). Additionally, the infotainment head unit 104 displays the infotainment system 116 on, for example, the center console display. The infotainment system 116 includes a navigation application that displays a map (e.g., the map 200 of FIG. 2 below) and provides navigational directions.

The water depth detector 106 estimates the current water depth under vehicle 100, the water depth on a current route and surrounding routes, if the current water depth has reached a warning threshold, and if water depth exceeds or is expected to exceed a depth limit of the vehicle 100 the route by the time the vehicle arrives there. As shown below in FIG. 2, the water depth detector 106 updates the map 200 to warn the driver about current water level or expected water levels on the route. In some examples, the water depth detector 106 analyzes road segments between the current location of the vehicle 100 and a destination to determine if there is a route that includes road segments with a lesser risk rating. In such examples, if there is such a route, the water depth detector 106 presents the alternate route to the driver.

The example water depth detector 106 of FIG. 1 classifies road segments into categories based on (a) the risk of water on the roadway and/or (b) the projected depth of water on the roadway. In some examples, the water depth detector 106 classifies the road sections with a minimal risk rating, a low risk rating, a medium risk rating, and a high risk rating. The minimal risk rating specifies, for example, that the road segment does not have a history of standing water. The low risk rating specifies, for example, that (a) the road segment has a history of sufficient draining given the current amount of rainfall, and/or (b) an amount of standing water that has been reported (e.g., by other vehicles, by the weather stations, by the weather drone 114, etc.) on the road segment is less than a first threshold amount of accumulated water (e.g., six inches). The medium risk rating specifies, for example, that (a) the road segment has a history of water accumulation given the current amount of rainfall (e.g., the rate of accumulation of water is greater than the rate the drainage system is able to remove the water), and/or (b) the amount of standing water that has been reported on the road segment is between the first threshold amount of accumulated water and a second threshold amount of accumulated water (e.g., twelve inches). The high risk rating specifies, for example, that (a) the road segment has a history of flooding given the current amount of rainfall, and/or (b) the amount of standing water that has been reported on the road segment is greater than the second threshold amount of accumulated water. In some examples, the first and second threshold amounts of accumulated water are adjusted based on the ground clearance and/or a water clearance level of the vehicle 100. For example, if the ground clearance of the vehicle is 8.7 inches, the first threshold may be 8.7, and the second threshold may be 14.7 inches. Some vehicles 100 have water clearance levels when they are design to ford areas of water. For example, the vehicle may have a water clearance level of 27 inches.

To estimate (i) the current water depth under vehicle 100, (ii) the water depth on a current route and surrounding routes, (iii) if the current water depth has reached a warning threshold (e.g., the second threshold amount of accumulated water), and (iv) if water depth exceeds or is expected to exceed a depth limit of the vehicle 100 the route by the time the vehicle arrives there, the water depth detector 106 analyzes data received from the servers 112, data received from other vehicles (e.g. via vehicle-to-vehicle communication), the data received from the weather drone, and/or the data received from weather stations (e.g., via vehicle-to-infrastructure communication), etc. In some examples, the received data includes (a) a current rate of rainfall, (b) predicted rates of rainfall (e.g., in five minutes, in ten minutes, etc.), (c) the elevation of the vehicle 100, (d) historical flood data, (e) historical car abandonment data, (f) storm drainage rate data, (g) sensor data from other vehicles, and/or (h) current route information (e.g., the road segments used by the route), etc. Additionally, in some examples, the water depth detector 106 analyzes data from sensors 118 (e.g., proximity sensors, cameras, infrared sensors, etc.) of the vehicle 100 and the ground clearance and/or water clearance level of the vehicle 100. In some examples, when the water depth detector 106 detects the depth of the water (e.g., with the vehicle sensors 118), the water depth detector 106 transmits the depth of the water to other vehicles via the on-board communications platform 102.

The water depth detector 106 provides an audio, visual, and/or haptic warning (e.g., via the infotainment head unit 104) when the vehicle 100 enters a road segment with a low, medium or high risk rating. The urgency of the warning is based on the level of the risk rating. For example, the pitch, loudness, and/or frequency of an audio warning may increase as the risk rating increases.

Figure 2:
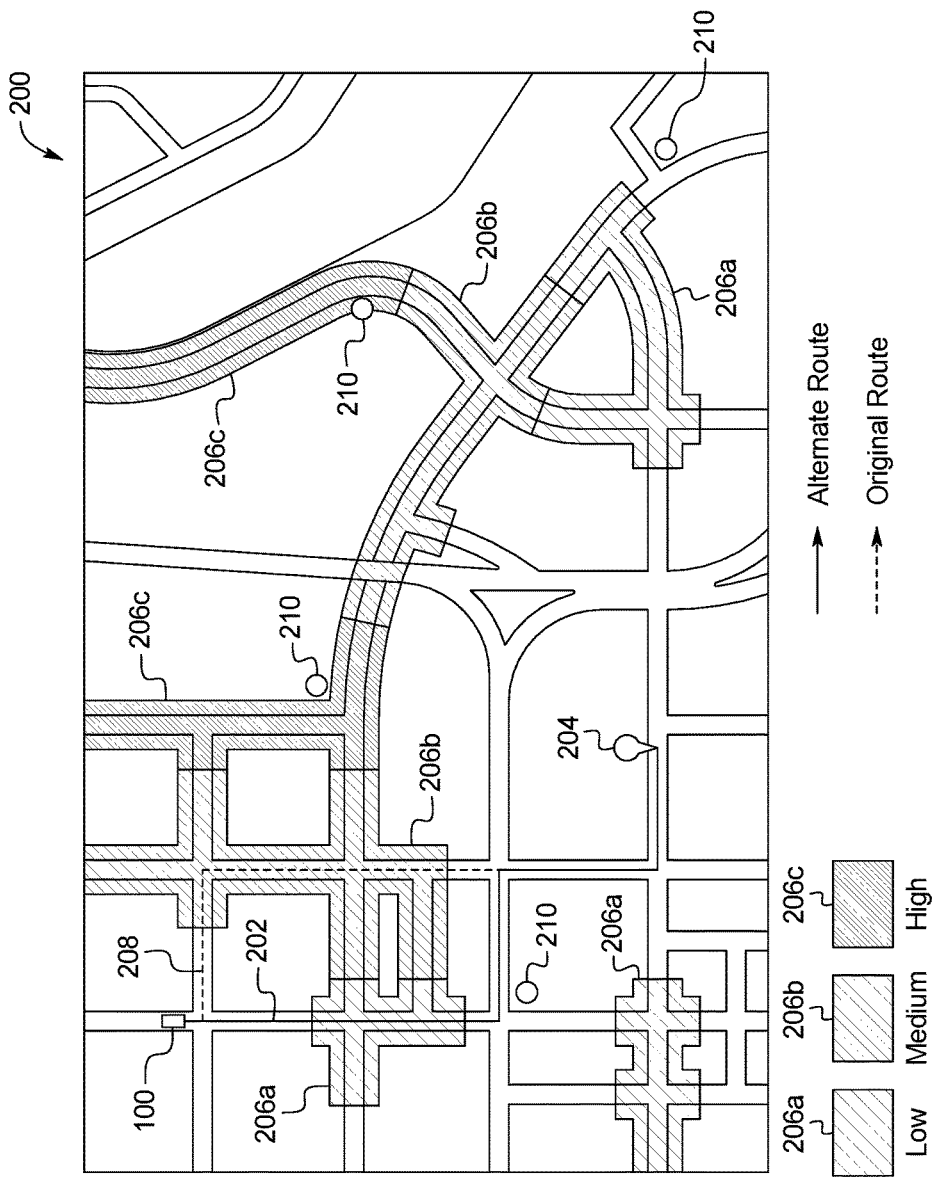
FIG. 2 depicts an example map with water depth risk ratings.

FIG. 2 depicts an example map 200 with water depth risk ratings. The example map 200 may be display on the center console display of the infotainment head unit 104. In the illustrated example, the map 200 depicts roadways in an area around the vehicle 100. Additionally, the map 200 includes an alternate route 202. The alternate route 202 is a route selected by the water depth detector 106 after analyzing the road segments between the vehicle 100 and a destination 204 that minimizes the risk ratings of risk rating zones 206a-206c to be traversed by the vehicle 100. In some examples, the map 200 also displays an original route 208 (e.g., the route of the vehicle 100 before the alternate route 202 was selected. In the illustrated example, the map 200 also displays locations of weather stations 210. The weather stations 210 include infrastructure nodes that broadcast measurements from water depth gauges and/or rainfall gauges.

The map 200 includes the risk rating zones 206a-206c. The risk rating zones 206a-206c reflect the risk rating of the corresponding road segments. In the illustrated example, the risk rating zones 206a-206c include a low risk rating zones 206a, a medium risk rating zones 206b, and a high risk rating zones 206c. The risk rating zones 206a-206c are color-coded and/or patterned to provide a visual indicator of the risk. In some examples, the low risk rating zones 206a is colored yellow, the medium risk rating zones 206b is colored orange, and the high risk rating zones 206c is colored red. The risk rating zones 206a-206c may be color-coded and/or patterned in any suitable manner. For example, the map 200 may include modes to facilitate color blind occupants of the vehicle 100.

Figure 3:
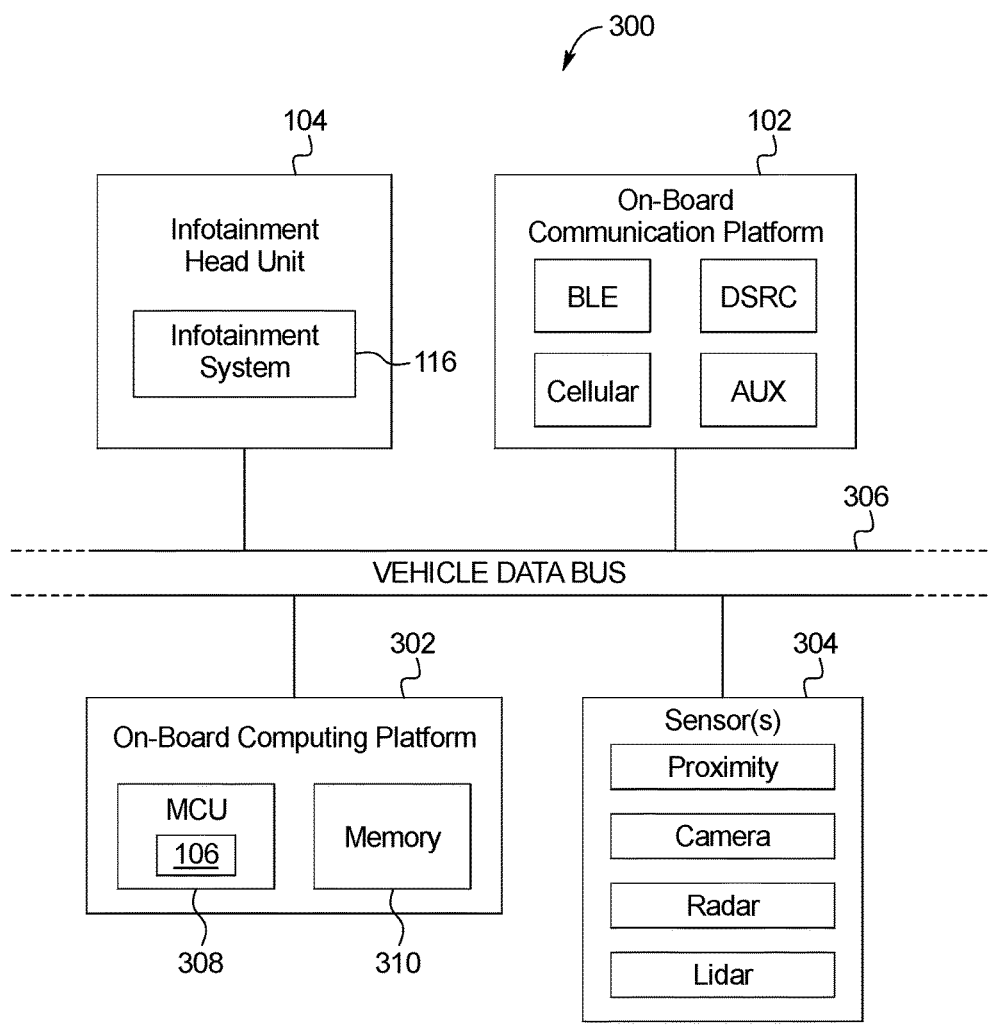
FIG. 3 is a block diagram of electronic components of the vehicle of FIG. 1.

FIG. 3 is a block diagram of electronic components 300 of the vehicle 100 of FIG. 1. In the illustrated example, the electronic components 300 include the on-board communications platform 102, the infotainment head unit 104, an on-board computing platform 302, sensors 304, and a vehicle data bus 306.

The on-board computing platform 302 includes a processor or controller 308 and memory 310. In some examples, the on-board computing platform 302 is structured to include the water depth detector 106. Alternatively, in some examples, the water depth detector 106 may be incorporated into another electronic control unit (ECU) with its own processor 308 and memory 310. The processor or controller 308 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 310 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 310 includes multiple kinds of memory, particularly volatile memory and non-volatile memory.

The memory 310 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 310, the computer readable medium, and/or within the processor 308 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 304 may be arranged in and around the vehicle 100 in any suitable fashion. The sensors 304 may measure properties around the exterior of the vehicle 100. Additionally, some sensors 304 may be mounted inside the cabin of the vehicle 100 or in the body of the vehicle 100 (such as, the engine compartment, the wheel wells, etc.) to measure properties in the interior of the vehicle 100. For example, such sensors 304 may include accelerometers, odometers, tachometers, pitch and yaw sensors, wheel speed sensors, microphones, tire pressure sensors, and biometric sensors, etc. In the illustrated example, the sensors 304 include proximity sensors, cameras, RADAR, and LiDAR. The water depth detector 106 uses the sensors 304 to detect the water on the roadway and/or detect the depths of the water on the roadway.

The vehicle data bus 306 communicatively couples the on-board communications platform 102, the infotainment head unit 104, the on-board computing platform 302, and the sensors 304. In some examples, the vehicle data bus 306 includes one or more data buses. The vehicle data bus 306 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
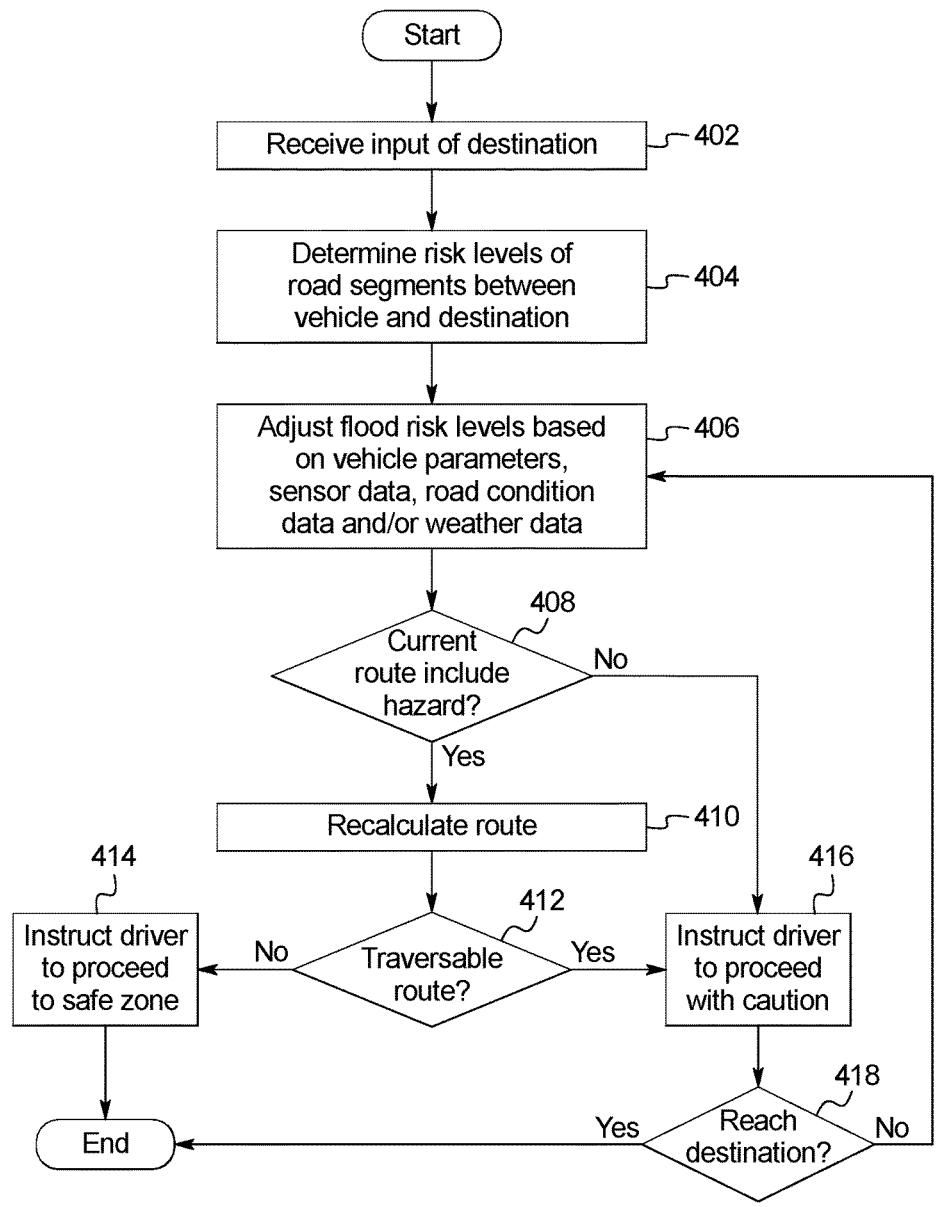
FIG. 4 is a flowchart of a method for vehicle navigation with water depth detection that may be implemented by the electronic components of FIG. 3.

FIG. 4 is a flowchart of a method for vehicle navigation with water depth detection that may be implemented by the electronic components 300 of FIG. 3. Initially, at block 402, the water depth detector 106 receives an input of a destination via the infotainment system 116. At block 404, the water depth detector 106 determines the locations and the risk levels of risk rating zones 206a-206c for the area between the current location and the destination received at block 402. In some examples, the water depth detector 106 bases the determination on (a) live weather data (e.g., current rainfall, forecasted rainfall, expected accumulation rate, etc.), (b) historical flood data (e.g., commonly flooded areas, where cars are generally abandoned, historical water accumulation), (c) navigation data (e.g., road segment data for the region around the vehicle 100), and/or (d) data from a weather drone 114 (e.g., real-time water accumulation data, hazard detection data, etc.), etc.

At block 406, the water depth detector 106 adjusts the determinations made at block 404 based on (a) the ground clearance and/or water level clearance of the vehicle 100 and/or (b) road condition data received from the weather station(s) 210. At block 408, the water depth detector 106 analyzes the risk rating zones 206a-206c associated with road segments of the current route (e.g., the route 208 of FIG. 2). If the road segments of the current route include a hazard, the method continues to block 410. Otherwise, if the road segments of the current route do not include a hazard, the method continues to block 416. In some examples, the water depth detector 106 determines there is a hazard if any of the road segments are associated with the low risk rating zones 206a, the medium risk rating zones 206b, or the high risk rating zones 206c. Alternatively, in some examples, there is a hazard if any of the road segments are associated with the medium risk rating zones 206b, or a high risk rating zones 206c, and not the low risk rating zones 206a.

At block 410, the water depth detector 106 recalculates the route (e.g., to become the alternate route 202 of FIG. 2) by analyzing the road segments between the current location of the vehicle 100 and the destination. At block 412, the water depth detector 106 determines whether there is an traversable alternate route to the destination. As used herein, a traversable route is a route where there are no hazards. If there is not a traversable route, the method continues to block 414. Otherwise, if there is a traversable route, the method continues at block 416. At block 414, the water depth detector 106 instructs the driver, via the infotainment system 116, to proceed to a safe zone or select a new destination. In some examples, safe zones are designated as areas (e.g., by emergency responders, etc.) that will likely not experience flooding. At block 416, the water depth detector 106 instructs the water depth detector 106 instructs the driver, via the infotainment system 116, to proceed to the destination with caution. At block 418, the water depth detector 106 determines whether the vehicle 100 is at the destination received at block 402. If the vehicle 100 is at the destination, the method ends. Otherwise, if the vehicle 100 is not at the destination, the method returns to block 406.

The flowchart of FIG. 4 is representative of machine readable instructions stored in memory (such as the memory 310 of FIG. 3) that comprise one or more programs that, when executed by a processor (such as the processor 308 of FIG. 3), cause the vehicle 100 to implement the example water depth detector 106 of FIGS. 1 and 3. Further, although the example program(s) is/are described with reference to the flowchart illustrated in FIG. 4, many other methods of implementing the example water depth detector 106 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
memory storing instructions; and
a processor to execute the instructions to cause the vehicle to:
determine a current and a projected water depth for road segments of and around a current route to a destination based on weather data and historical flood data received from an external server, the weather data including current and expected rainfall, and the historical flood data including previous water depth measurements for the road segments associated with the current and the expected rainfall and historical locations of vehicles abandoned due to flooding; and in response to the current or the projected water depth of the road segments of the current route exceeding a first threshold, determine an alternate route to the destination.

2. The vehicle of claim 1, wherein the instructions cause the vehicle to assign risk levels to the road segments of and around the current route to the destination based on a ground clearance of the vehicle and the current and the projected water depth of the road segments of and around the current route to the destination.

3. The vehicle of claim 2, wherein to determine the alternate route to the destination, the instructions cause the vehicle to:

compare the risk levels of the road segments of and around the current route to the destination; and select the alternate route including the road segments with lower risk levels.

4. The vehicle of claim 2, wherein the instructions cause the vehicle to adjust the risk levels based on weather data received from a weather station adjacent to one of the road segments.

5. The vehicle of claim 2, wherein the instructions cause the vehicle to adjust the risk levels based on weather data received from a weather drone measuring the water depth of one of the road segments.

6. A method comprising:

determining, with a processor, a current and a projected water depth for road segments of and around a current route to a destination based on weather data and historical flood data received from an external server, the weather data including current and expected rainfall, and the historical flood data including previous water depth measurements for the road segments associated with the current and the expected rainfall and historical locations of vehicles abandoned due to flooding; and in response to the current or the projected water depth of the road segments of the current route exceeding a first threshold, determining an alternate route to the destination.

7. The method of claim 6, including assigning risk levels to the road segments of and around the current route to the destination based on a ground clearance of a vehicle and the current and the projected water depth of the road segments of and around the current route to the destination.

8. The method of claim 7, wherein determining the alternate route to the destination includes:

comparing the risk levels of the road segments of and around the current route to the destination; and selecting the alternate route to comprise the road segments with lower combined risk levels.

9. The method of claim 7, including adjusting the risk levels based on weather data received from a weather station adjacent to one of the road segments.

10. The method of claim 7, including adjusting the risk levels based on weather data received from a weather drone measuring the water depth of one of the road segments.

11. A method comprising:

receiving, from a server, data including current and expected rainfall and historical locations of vehicles abandoned due to flooding;

determining, with a vehicle processor, a projected water depth for road segments of and around a current route to a destination based on the received data; and in response to the projected water depth of the road segments of the current route exceeding a first threshold, determining an alternate route to the destination.

* * * * *